C. LAMB.
Hanging Gang-Saws.
No. 210,787. Patented Dec. 10, 1878.
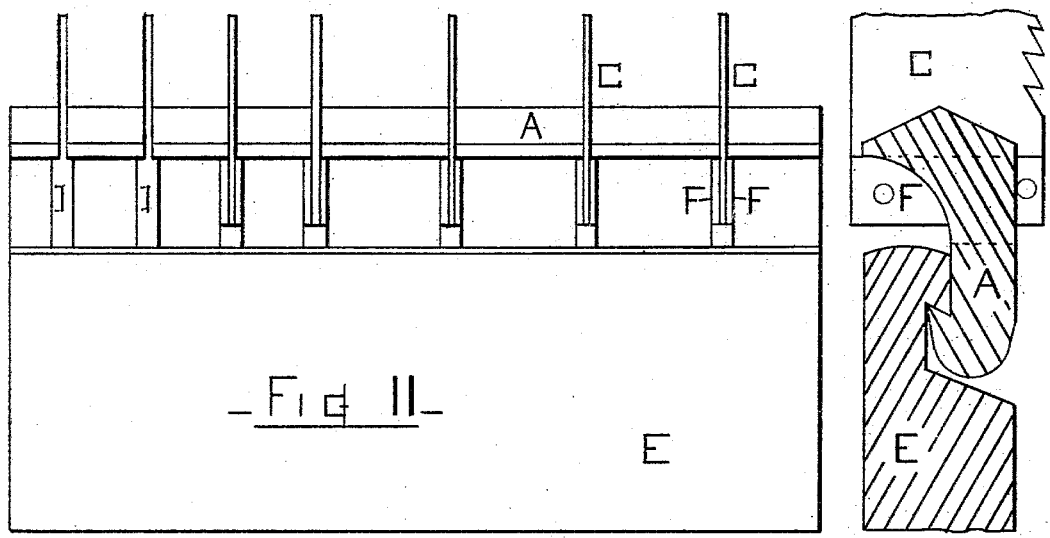
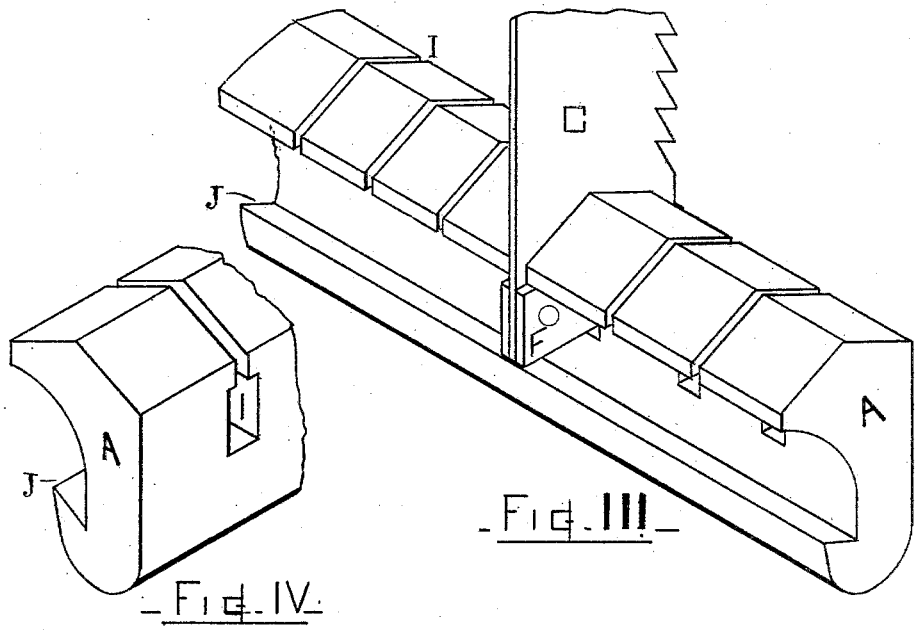
Witnesses,
Frank P. Leffingwell
A. Langdon Schuyler
Inventor,
Chancy Lamb
By W. W. Sanborn, his Att'y

UNITED STATES PATENT OFFICE.

CHANCY LAMB, OF CLINTON, IOWA, ASSIGNOR TO C. LAMB & SONS, OF SAME PLACE.

IMPROVEMENT IN HANGING GANG-SAWS.

Specification forming part of Letters Patent No. 210,787, dated December 10, 1878; application filed November 23, 1878.

*To all whom it may concern:*

Be it known that I, CHANCY LAMB, of Clinton city, in Clinton county, in the State of Iowa, have invented a new and useful Improvement in Hanging Gang-Saws, which improvement is fully set forth in the following specification and accompanying drawing, in which—

Figure 1 is a cross-section. Fig. 2 is a side view; Fig. 3, a perspective showing how the saws are attached; Fig. 4, a perspective showing opposite side of Fig. 3.

The object of my invention is to do away with the gage-bars and hooks usually used in hanging gang-saws, and which are liable to derangement in working; also, to furnish a stronger and more durable method of confining the saws in place.

I do this by constructing the hook-bar A of a solid piece of metal of any suitable kind, usually Bessemer steel, thus getting the greatest amount of strength in the least amount of space. This bar A is slotted at the required distance apart for saws to be set to cut the lumber the proper thickness, as shown at I, Figs. 2, 3, and 4. The lower or bottom part of this bar A is made with a lip, J, Figs. 3 and 4. This lip hooks onto a corresponding lip on E, Figs. 1 and 2, which is bolted to or may be a part of bottom rail to the gate.

The bottom ends of the saws C have lugs F securely riveted, and are adjusted to fit in the slots I, as shown at F in Figs. 1, 2, and 3. The slots I, of course, may be put any desired distance apart.

I construct the top of the gage and hook-bar A with a ridge or angle, the better to cut or crush any obstruction that may get between the hook-bar and log.

To set the saws C in place, first slide the bottom in its place in the slot I; bring the top to its place, and key firmly in the ordinary way.

I make this gage and hook-bar of different sizes, to fit any desired size gang-gate.

It is obvious that this bar A may be attached to any gang-saw gate.

Having thus described my invention, what I claim as new, and desire to secure by Letters Patent, is—

In hanging gang-saws, the gage and hook-bar A, fitted with slots and lip, substantially as shown and described.

CHANCY LAMB.

Witnesses:
W. W. SANBORN,
ARTEMUS LAMB.